United States Patent [19]

Hampton

[11] Patent Number: 4,554,866
[45] Date of Patent: Nov. 26, 1985

[54] MECHANICAL EGG BREAKER AND SEPARATOR

[76] Inventor: Ernestine Hampton, 400 Mt. Washington Dr., Los Angeles, Calif. 90065

[21] Appl. No.: 544,222

[22] Filed: Oct. 21, 1983

[51] Int. Cl.⁴ ............................................. A23J 1/09
[52] U.S. Cl. ......................................... 99/499; 99/497
[58] Field of Search .................................. 99/497–500, 99/496, 537, 568, 495, 577, 578, 581, 582; 30/120.1; 426/490, 495, 478–480

[56] References Cited

U.S. PATENT DOCUMENTS

| | | | |
|---|---|---|---|
| 2,867,254 | 1/1959 | Mowat | 99/497 |
| 3,137,330 | 6/1964 | MacLagan | 99/568 X |
| 3,147,783 | 9/1964 | Noltes | 99/582 X |
| 3,470,925 | 10/1969 | Noren | 99/537 |
| 4,137,838 | 2/1979 | Warren | 99/582 X |

*Primary Examiner*—Timothy F. Simone
*Attorney, Agent, or Firm*—Christie, Parker & Hale

[57] ABSTRACT

An apparatus for rapidly breaking and separating eggs is disclosed. The apparatus comprises an egg holder for holding a plurality of eggs stationary in a select number of rows. A pair of contiguous knife blades are positioned below each row of eggs. The knife blades are movable from a lower position below the eggs to an upper position wherein the knife blades break the shells of the eggs. The knife blades are movable horizontally to a spaced-apart position to allow the egg contents to drain between the knife blades. A receptacle is provided for receiving the egg contents. A hollow cone with a depressible collar is preferably positioned below each egg to receive the egg contents. The collar can be depressed to allow the egg whites to overflow the cones into the receptacle and only the egg yolks are retained within the cones.

23 Claims, 23 Drawing Figures

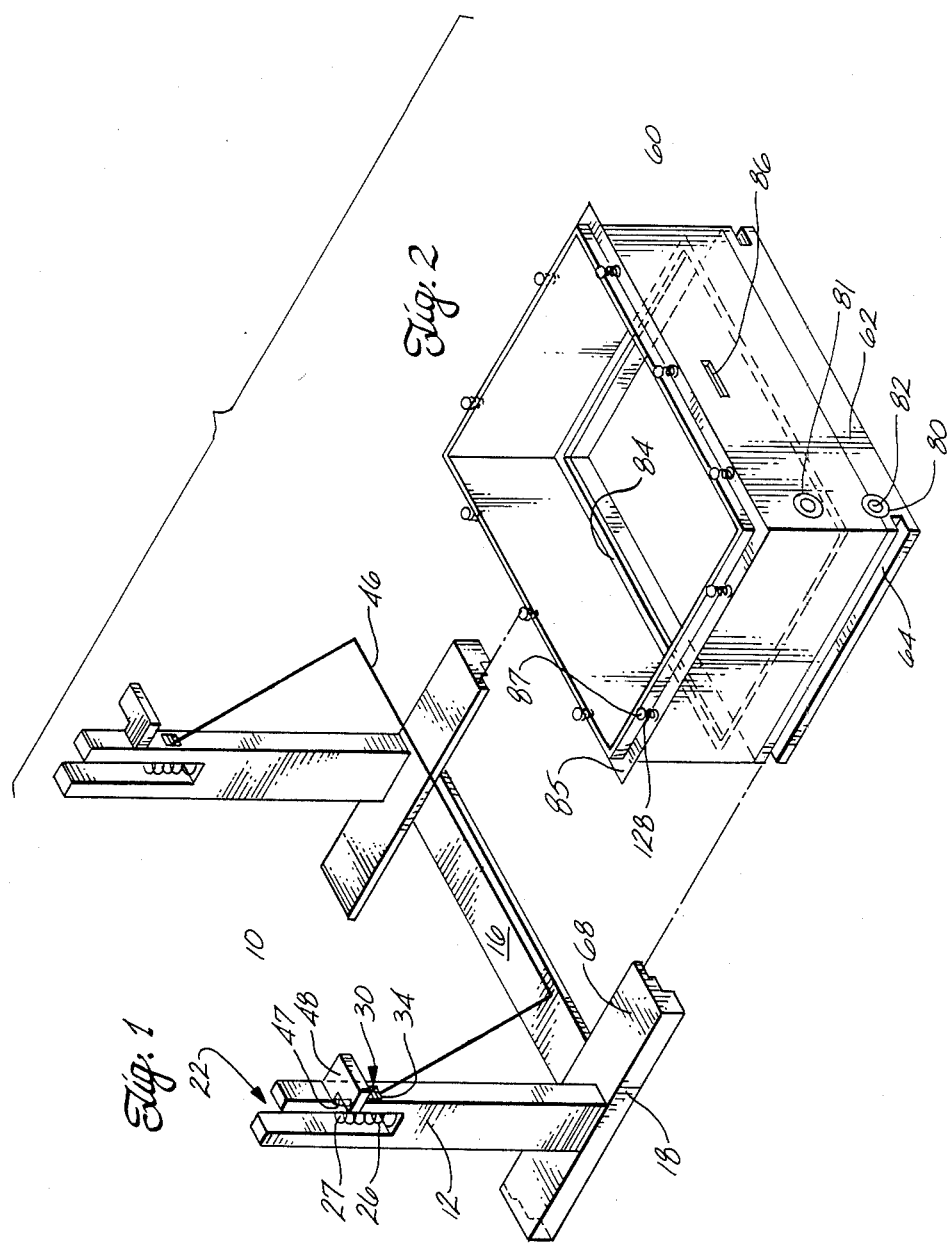

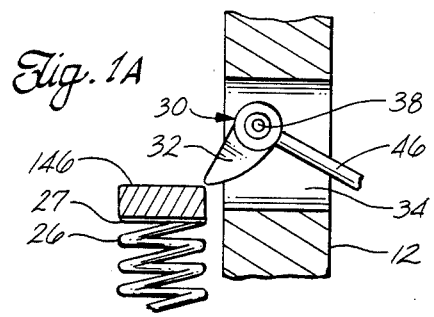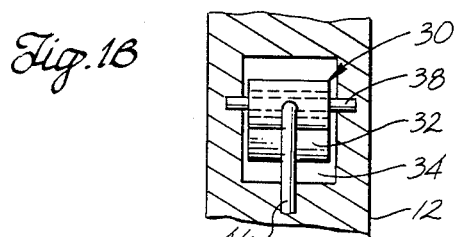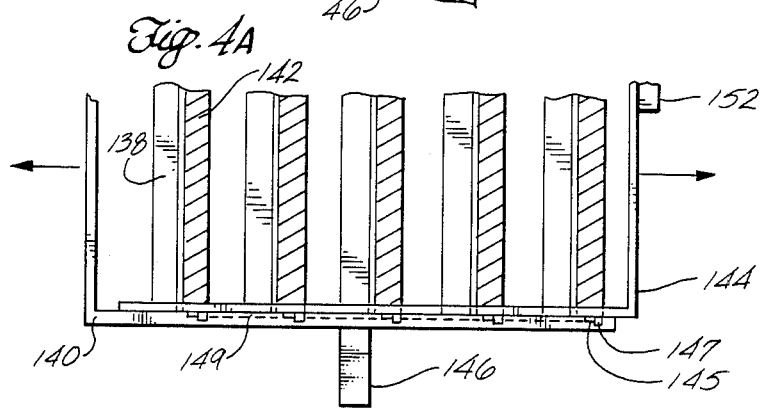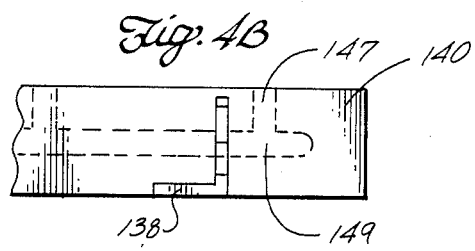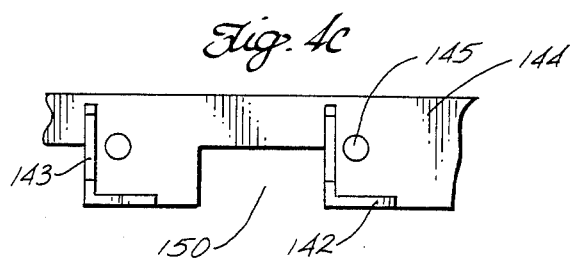

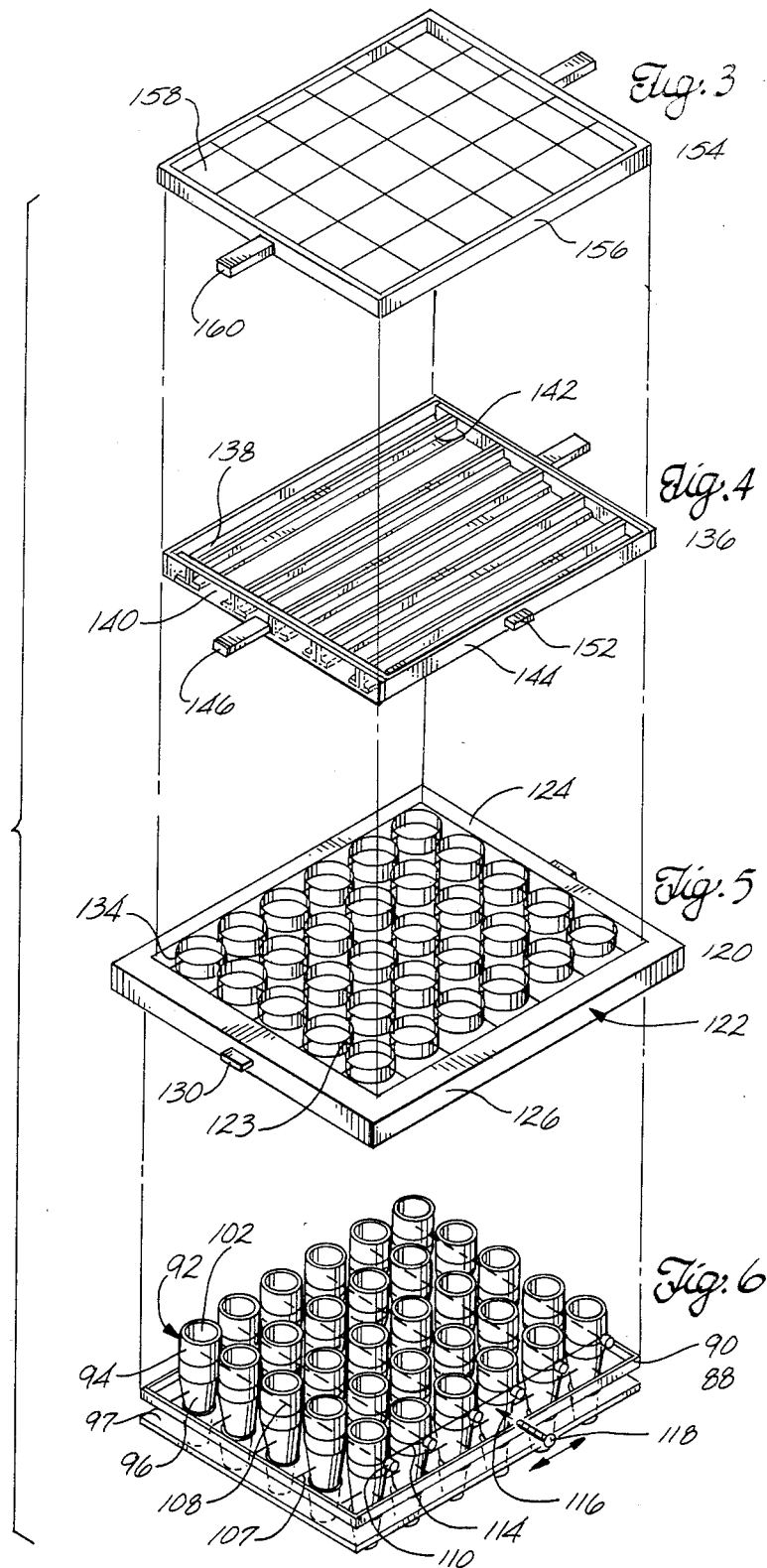

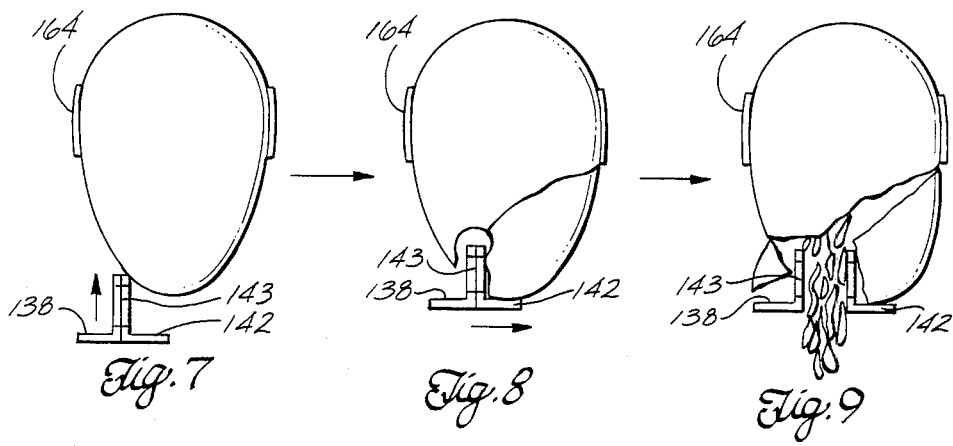
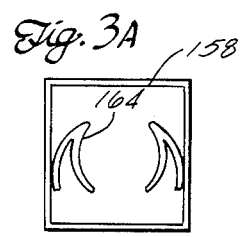
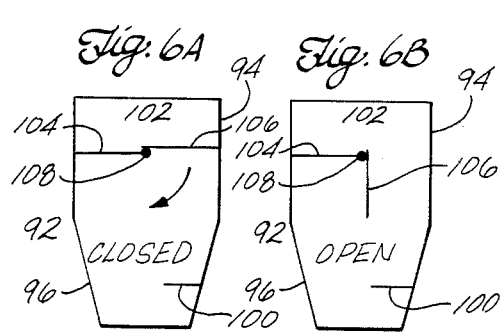
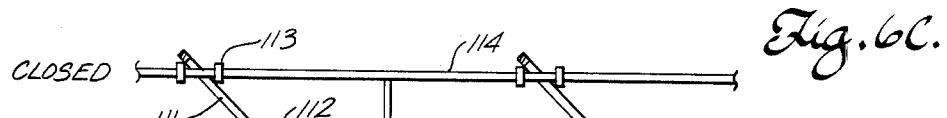
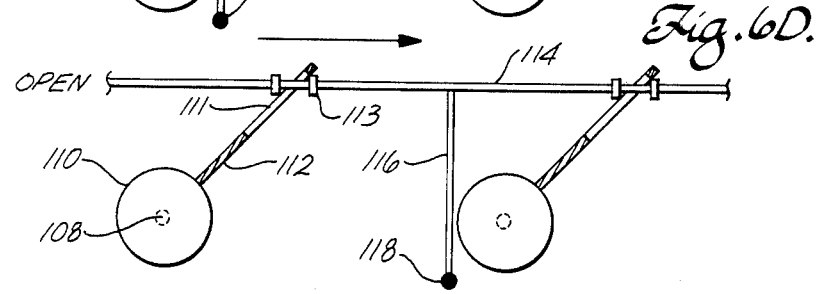

MECHANICAL EGG BREAKER AND SEPARATOR

FIELD OF THE INVENTION

The present invention is directed to an egg breaking apparatus and more particularly to an apparatus for simultaneously breaking and separating a plurality of eggs for use in commercial food preparation.

BACKGROUND OF THE INVENTION

Commercial bakeries, hospitals, restaurants and others involved in the preparation of food on a commercial scale typically break eggs by hand. When a substantial number of eggs is involved, as is often the case in commercial food preparation, such procedure can be very time consuming. If separation of egg yolk from the egg white is also required, the time involved is even greater. Accordingly, a need exists for a means for rapidly breaking a plurality of eggs and for separating the egg yolks from the egg whites.

SUMMARY OF THE INVENTION

In accordance with the invention, there is provided an apparatus for rapidly breaking eggs. The apparatus comprises an egg holder for holding a plurality of eggs in an array. Knife means are provided for breaking the shells of eggs held by the egg holder to discharge the contents of the eggs. The apparatus further comprises a receptacle for receiving the discharged contents of eggs broken by the knife means.

The knife means preferably comprise a pair of generally horizontally extending contiguous knife blades are positioned below the egg holder. The knife blades are movable vertically from a lower position spaced-apart from the egg holder and an upper position sufficiently close to the egg holder for the knife blades to contact and break an egg held by the egg holder. The knife blades are movable horizontally from the contiguous position to a spaced-apart position to allow contents of the broken eggs to drain between the knife blades.

The apparatus preferably comprises means for supporting the egg holder and knife blades at positions above the receptacle and spring means for biasing the knife blades toward the upper position for supplying a force for breaking the eggs. Means for releasably maintaining the knife blades in the lower position can be provided to prevent the spring means from acting on the knife blades until desired.

A preferred apparatus also comprises means for separating the egg yolks from the whites of the eggs which have been broken by the knife blades. A preferred means for separating the egg yolks from the egg whites comprises a hollow cone having an open top positioned below each egg held by the egg holder for receiving the contents of the egg when broken by the knife blades. Each cone preferably has an interior volume about equal to the volume of an egg yolk. A cylindrical collar is preferably fitted around the cone and extends above the cone. When an egg is broken above a cone, the contents of the egg drain into the cone and collar. The collar can be depressed to allow the egg white to gently overflow the cone into the receptacle so that only the egg yolk is retained within the cone.

In a more preferred apparatus, the cones have an openable bottom and the receptacle is subdivided into an upper chamber in which egg whites overflowing the cones collect and a lower chamber into which egg yolks retained by the cones can be released.

A particularly preferred apparatus comprises an egg-holder grid comprising a plurality of egg holders arranged in a select number of rows, preferably six rows of five egg holders for holding 30 eggs. A knife grid is positioned below the egg-holder grid and comprises a pair of contiguous knife blades below each row of egg holders. The knife grid is movable from a lower position spaced-apart from the egg-holder grid to an upper position sufficiently close to the egg-holder grid for the knives to break eggs held by the egg holders. At least one knife of each pair is movable horizontally to a spaced-apart position so that the contents of eggs cracked by the knives when in the contiguous position can drain between the knife blades when moved to the spaced-apart position.

The apparatus further comprises a cone assembly which is fitted into the receptacle. The cone assembly comprises a plurality of cones positioned below the egg holders, each cone having an open top, an openable bottom and a volume about equal to the volume of an egg yolk. The cones extend through an intermediate floor which subdivides the interior of the receptacle into an upper chamber and a lower chamber. Egg whites overflowing the cone collect in the upper chamber and egg yolks retained by the cone can be released through the bottom of the cone into the lower chamber.

A collar grid is positioned between the knife blades and the cone assembly. The collar grid comprises a generally cylindrical collar which is snugly fitted around each cone of the cone assembly. The collar grid is afforded vertical movement between an upper position wherein the collars extend above the cones and, with the cones, receive the entire contents of the broken eggs, and a lower position wherein the collars are at or below the upper edges of the cones and allow the egg whites to gently overflow the cones and collars, thereby avoiding unbalancing and resultant breakage of the yolk retained within the cone or commingling of yolks and egg whites.

The present invention further comprises a method for simultaneously breaking a plurality of eggs. The method comprises holding a plurality of eggs in a generally stationary position in a select number of generally horizontal rows. A pair of contiguous knife blades are positioned below each row of eggs. The knife blades are moved upwardly with sufficient force to break the shells of the eggs. At least one knife blade of each pair is then moved horizontally away from the other knife blade to allow the contents of the egg to drain between the knife blades. The contents of the broken eggs are received in a receptacle positioned below the knife blades.

The method preferably comprises the step of separating the egg whites from the egg yolks of eggs broken by the knife blades. Such separation is preferably accomplished by positioning a cone having an open top and a volume about equal to the volume of an egg yolk below each egg. A depressible cylindrical collar is preferably fitted around the cone and extends above the cone. The cone and collar receive the contents of the broken egg. The collar is depressed allowing the egg white to overflow the cone and collar into the receptacle and only the egg yolk is retained by the cone.

It is further preferred that the cone have an openable bottom and that the receptacle is subdivided into an upper chamber and a lower chamber so that egg whites overflowing the cones collect in the upper chamber and egg yolks retained in the cones are released into the lower chamber through the openable bottom.

Brief Description of the Drawings

These and other features and advantages of the present invention will be better understood by reference to the following detailed description when considered in conjunction with the accompanying drawings wherein:

FIG. 1 shows an isometric drawing of the U-frame which supports the other components of the invention.

FIG. 1A shows a cut-away side view of a latch mechanism of the U-frame of FIG. 1.

FIG. 1B shows a front view of the latch mechanism of FIGS. 1 and 1A.

FIG. 2 shows an isometric drawing of the egg-holding tank which slides onto the U-frame of FIG. 1.

FIG. 3 shows an isometric drawing of the egg-holder grid which fits into the slots in the U-frame of FIG. 1.

FIG. 3A shows a top view of one of the holders in the egg-holder grid of FIG. 3.

FIG. 4 shows an isometric drawing of the knife grid which also fits into the slots in the U-frame of FIG. 1.

FIG. 4A shows a top view of a section of the knife grid of FIG. 4.

FIG. 4B shows a side view of a section of the outside, stationary frame of the knife grid of FIGS. 4 and 4A.

FIG. 4C shows a side view of a section of the inside, sliding frame of the knife grid of FIGS. 4 and 4A.

FIG. 5 shows an isometric drawing of the collar grid which fits over the top edge of the holding tank of FIG. 2.

FIG. 6 shows an isometric drawing of the cone insert which fits into the holding tank of FIG. 2.

FIG. 6A shows a side view of the rotating trap-door present in each of the cones in the cone insert of FIG. 6 in the closed position.

FIG. 6B shows a side view of the rotating trap-door of FIG. 6A in the open position.

FIG. 6C shows a side view of the activating mechanism for the rotating trap-doors of FIGS. 6A and 6B in the closed position.

FIG. 6D shows a side view of the activating mechanism of FIG. 6C in the open position.

FIG. 7 shows a side view of the initial position of an egg in the holders of FIGS. 3 and 3A with respect to the knife grid of FIGS. 4 and 4A.

FIG. 8 shows a side view of an intermediate position in the egg breaking process where the knife grid of FIGS. 4 and 4A has moved up to penetrate the egg's shell.

FIG. 9 shows a side view of the final position in the egg breaking process where the associated blades of the knife grid of FIGS. 4 and 4A have been slid apart.

DETAILED DESCRIPTION

Figure 10A:
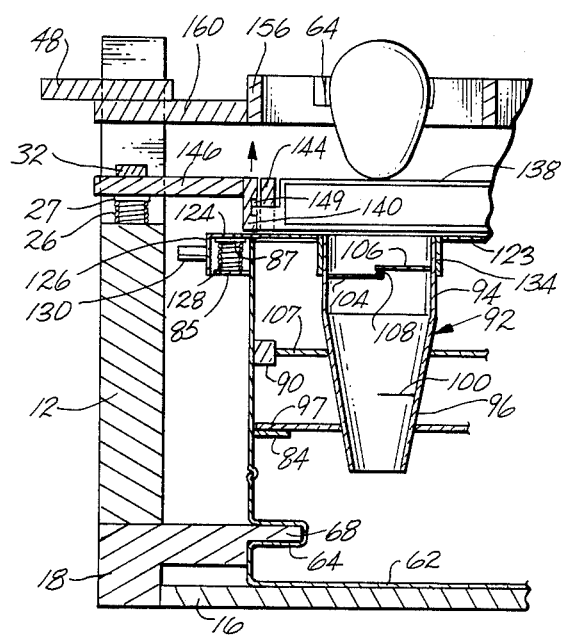
FIG. 10A shows a cut-away side view of a portion of the components of the invention in the initial position of an egg-breaking process.

The present invention pertains to a mechanical egg breaker and/or separator which utilizes a dual-motion knife to allow a large number of eggs to be efficiently and rapidly cracked and separated at one time. The following is a description of a preferred embodiment of the invention shown in the drawings.

With reference to FIG. 1, a U-shaped frame 10 serves as the basic support for the other components of the egg breaker. The frame 10 comprises two generally vertical standards 12, each supported by a generally horizontal base segment 18. The standards 12 are rigidly connected at their bottom center by a generally horizontal brace 16.

Each vertical standard 12 has a generally vertical, rectangular slot 22 at its upper end. Positioned at the bottom of each slot 22 is a generally vertical coil spring 26. Attached to the upper ends of each coil spring 26 is a disc 27 to provide a surface for receiving knife grid 136, shown in FIGS. 4 and 4A described in detail herein.

Associated with each slot 22 and coil spring 26 is a latch mechanism 30 for releasably maintaining the coil spring 26 in a compressed state. Front and side details of latch mechanism 30 are shown in FIGS. 1A and 1B. Each latch mechanism 30 comprises a tang 32 which is mounted in a rectangular hole 34 in the standard 12 adjacent the slot 22. A pin 38 is rigidly mounted and extends across hole 34 and is embedded in the opposite walls of the standard 12 defining the hole 34.

The tang 32 is rotatably mounted on pin 38 and is afforded angular movement from a first position wherein the tang is completely disposed within hole 34 and a second position wherein the tang 32 protrudes into slot 22.

The latch mechanism 30 is positioned so that, when the tang 32 protrudes into the slot 22, the underside of tang 32 engages the extension 146 of knife grid 136 which rests on disk 27 and maintains the coil spring 36 in a compressed state. Movement of tang 32 to the first position releases disk 27 and allows coil spring 26 to expand. Movement of tang 32 is controlled by an activation rod 46 which is fixedly attached to tang 32 and extends in a direction away from slot 22.

A slot blocker 48 is mounted by hinge 47 to the side of each standard 12 and is afforded rotatable movement between an open position extending away from slot 22 and a closed position extending into and blocking the open end of slot 22.

Alternatively, slot blocker 48 can be mounted on the top of vertical standard 12. However, such an embodiment requires a locking mechanism to prevent upward movement of slot blocker 48 when the slot blocker 48 extends into slot 22 and when an upward force is applied to it.

With reference to FIG. 2, a holding tank 60 is shown which serves as a receptacle for the contents of the eggs broken by use of this invention. Holding tank 60 has a groove 64 along either side which enables holding tank 60 to slide onto frame 10 along tracks 68 thereby providing greater stability to the holding tank. Holding tank 60 is rectangular in shape, and, in an embodiment of the invention, is sufficiently large to catch the falling contents of thirty eggs arranged in five rows of six eggs. Such capability is preferred because eggs are often packaged in such a configuration. It would be appreciated by one of ordinary skill in the art that any number of shapes and sizes of holding tank 60 could be adopted by the invention to handle any number of eggs. Holding tank 60 has a removable bottom panel 62 to facilitate cleaning.

Holding tank 60 has an intermediate flange 84 extending about the interior of holding tank 60 at a position above the bottom panel 62. A top flange 85 extends around the exterior surface near the top edge of holding tank 60. Attached to the upper surface of top flange 85 are several springs 128. Discs 87 are attached to the upper ends of springs 128, to provide a surface for receiving collar grid 120, shown in FIG. 5 and described in detail later.

Holding tank 60 comprises a rectangular hole 86 in one side at a position between the intermediate flange 84 and the top flange 85. Near the bottom corner of holding tank 60, a "pop-out" spout 80 with attached cap 82 is provided to allow for emptying the lower portion of holding tank 60. A second "pop-out" spout 81 is positioned just above the intermediate flange.

With reference to FIG. 6, a cone insert 88 is shown which fits into the holding tank 60 of FIG. 2. Cone insert 88 comprises of 30 generally identical, hollow cones 92 arranged in a five-by-six pattern. The cones are mounted in a generally rectangular frame 90 and are rigidly interconnected by rods 107.

Cones 92 have a generally cylindrical upper section 94 and a generally conical lower section 96. The lower sections 96 of cones 92 fit into and are fixedly mounted in corresponding circular holes in a generally horizontal intermediate floor 97, below frame 90. Cone insert 88 is fitted inside holding tank 60 with the intermediate floor 97 resting upon intermediate flange 84 and frame 90 fitted snugly against the side walls of holding tank 60. Intermediate flange 84 is positioned so that when cone insert 88 is placed in holding tank 60, the bottom edges of the cones 92 are above the floor of holding tank 60, and the top edges of cones 92 are generally level with the top edge of holding tank 60. The intermediate floor divides the interior of the holding tank 60 into an upper chamber above the intermediate floor 97 and a lower chamber below intermediate floor 97.

With reference to FIGS. 6A and 6B, each cone 92 comprises a trap-door mechanism 102 positioned at about the midpoint of its upper section 94. The trap-door mechanism 102 comprises a fixed generally semi-circular plate 104 and a rotatable generally semi-circular plate 106. A rotatable rod 108 extends through each cone 92 in a row of cones at about the elevation of the fixed plate 104. The rotatable semi-circular plate 106 is rigidly attached along the underside of its straight edge to rod 108. The ends of rod 108 protrude from the cones 92 at the end of the row and are fitted with a cap 110, which is shown in side view in FIGS. 6C and 6D. Attached to each cap 110 is a needle-eyed spoke 112 which extends up and to the left at a 45° angle, as viewed in FIG. 6C, when the trap-door mechanism 102 is in the closed position, as shown in FIG. 6A. In the closed position, rotatable plate 106 partially overlaps fixed plate 104, preventing leakage at the trap-door.

Spokes 112 are coupled to rod 114, which is connected at about its center by a generally vertical elbow 116 to a generally horizontal screw-in knob 118, which extends from elbow 116 through rectangular hole 86 to the exterior of holding tank 60. Knob 118 is preferably removable so that cone insert 88 can be lifted out of holding tank 60 for easy cleaning.

Sliding knob 118 to the right, as shown in FIG. 6D, results in rod 108 being rotated 90° and rotatable plate 106 being moved into the open position, as shown in FIG. 6B.

When knob 118 is moved to the right, spokes 112 travel angularly, the ends of spokes moving through an arc. To accommodate the movement of the spokes 112, spokes 112 comprise an elongated needle-eyed opening 111 through which rod 114 extends. Rod 114 comprises stops 113 on either side of the opening 111 to assure movement of spokes 112 when rod 114 is moved. The needle-eyed openings 111 allow rod 114 to be moved in a generally straight line while allowing angular movement of the spokes.

About midway down the lower section 96 of cone 92, pin 100, or its equivalent, extends away from the wall to selectively break open an egg yolk passing through the cone 92 to allow for easier decanting of the egg yolks through pop-out spout 80.

With reference to FIG. 5, a collar grid 120 is positioned above the cone insert 88, and when mounted on the holding tank, rests on the discs 87 attached to springs 128, shown in FIG. 2. The collar grid 120 comprises 30 cylindrical, hollow sections arranged in a five-by-six pattern connected to one another and to a frame 122 by rods 123. The frame 122 is generally L-shaped having a generally horizontal upper side wall 124 and a generally vertical outer side wall 126. When in place above holding tank 60, the upper side wall 124 rests on discs 87 attached to springs 128. The dimensions of collar grid 120 are such that outer side wall 126 extends closely around top flange 85 when the collar grid 120 is depressed against the force of springs 128. Push tabs 130 are attached to opposite sides of frame 122 to aid in depressing the collar grid 120. For better access from the front, push tabs 130 are positioned on the sides of frame 122 adjacent vertical standards 12.

When collar grid 120 is at rest on the discs 87, i.e., when springs 128 are not compressed, the top edges of cones 92 slightly overlap the lower edges of hollow cylinders 134. The inner diameter of hollow cylinders 134 is just slightly larger than the outer diameter of the upper section of cones 92 so that, when collar grid 120 is depressed, hollow cylinders 134 slide down along the outside of cones 92. The height of hollow cylinders 134 is about half the length of the upper section 94 of cone 92 so that when collar grid 120 is fully depressed, the lower edges of hollow cylinders 134 do not interfere with the operation of rod 108 in activating the trap-doors.

With reference to FIG. 4, a dual-action knife grid 136 for breaking the eggs is provided. As shown knife grid 136 comprises a stationary frame 140 and a movable frame 144. Five stationary knife blades 138 having a generally L-shaped cross-section are fixedly attached at their ends to stationary frame 140. Five sliding knife blades 142, also having a generally L-shaped cross-section, are fixedly attached to a movable frame 144. Frame 140 comprises extensions 146 which extend into slots 22 in standards 12 and rest on coil springs 26.

The sliding knife blades 142 are positioned initially contiguous to the stationary knife blades 138. To accomplish this positioning, frame 144 is dimensioned to fit inside frame 140 and comprises notches 150 adjacent the sliding knife blades, as shown in the side view of FIG. 4C, which engage corresponding notches in the ends of stationary knife blades 137 adjacent frame 140.

To maintain the positioning of frame 140 relative to frame 144, frame 144 has cylindrical projections 145 as shown in the side view of FIG. 4C, which fit into corresponding vertical grooves 147 of frame 140, as shown in the side view of FIG. 4B. The vertical grooves 147 extend from the top edge of frame 140 to a horizontal groove 149. The cylindrical projections 145 are afforded slidable movement within horizontal groove 149. Vertical grooves 147 are located about midway between the two positions to be assumed by the cylindrical projections 145 during operation of the knife grid 136. Attached to one side of frame 144, away from standards 12 is pull tab 152, to facilitate the sliding of movable frame 144 within stationary frame 140.

The top view of FIG. 4A shows the stationary knife blades 138 and the sliding knife blades 142 in their initial contiguous position. From this position, movable frame 144 can be moved to the right, as shown, and thereby causing the sliding knife blades 142 to move away from the stationary knife blades 138 into a spaced-apart position. The space between the stationary and sliding knife blades provides room for the contents of an egg broken by the knife blades to drain out. In a particularly preferred embodiment, the vertical sections of both stationary knife blades 138 and sliding knife blades 142 comprise openings 143 to make an additional pathway through which the egg contents can drain. It would be appreciated by one of ordinary skill in the art that this could be accomplished in a variety of ways. One possible alternative embodiment would be to make the leading edge of the knife blades a taut wire.

With reference to FIG. 3, an egg-holder grid 154 is shown which transfers eggs to the egg breaker and holds them in place during the egg breaking process. Egg-holder grid 154 comprises a rectangular, external frame 156, inside of which is a wire grid of 30 generally square compartments 158 arranged in a five-by-six pattern and open at top and bottom. On opposite sides of frame 156 are attached bars 160 which extend into vertical, rectangular slots 22 of standards 12 and are held in place by slot blockers 48. The bars 160 also provide a convenient way to hold egg-holder grid 154 when lowering it over a commercial flat of eggs to pick up the eggs for transfer to the egg breaker.

FIG. 3A shown a top view of one of the square wire compartments 158. Flexible egg holders 164 are attached to the inside walls of compartments 158 near the bottom to grip the eggs during the egg breaking process. Holders 164 are flexible so that they can hold different sized eggs. As an alternative embodiment, holders 164 could be attached to two opposite inside corners of compartments 158 so that they could be more securely attached at two points.

To prepare the invention for operation, holding tank 60 is slid onto U-frame using grooves 64 and tracks 68. If the eggs are to be separated into yolks and whites as well as broken, cone insert 88 and collar grid 120 are engaged in place. If only breaking is required, cone insert 88 and collar grid 120 need not be used. Cone insert 88 is assembled in holding tank 60 with knob 118 unassembled. Once in place, knob 118 is assembled, extending through rectangular hole 86, and then slid all the way to the left, as shown in FIG. 6C. In such a position, the trap-door mechanisms 102 are closed. Collar grid 120 is then placed over the top edge of holding tank 60 so that all the hollow cylinders 134 fit around their corresponding cones 92.

Knife grid 136 is positioned in frame 10 so that extensions 146 fit into slots 26. Knife grid is pressed downwardly to compress coil springs 26, which are then held in a compressed state by latch mechanisms 30. Collar grid 120 is also depressed.

Initially, frame 144 is in a position wherein the stationary and sliding knife blades are contiguous. Egg-holder grid 154 is lowered over a commercial flat of 30 eggs, which are gripped by holders 164. Egg-holder grid 154 is then placed over knife grid 136 so that bars 160 fit into slots 22 and then it is locked in place by slot blockers 48 which are rotated into slots 22. The eggs in egg-holder grid 154 are positioned in contact with the knife grid 136, as shown in FIG. 7, and centered over corresponding hollow cylinders 134 and cones 92.

Figure 10B:
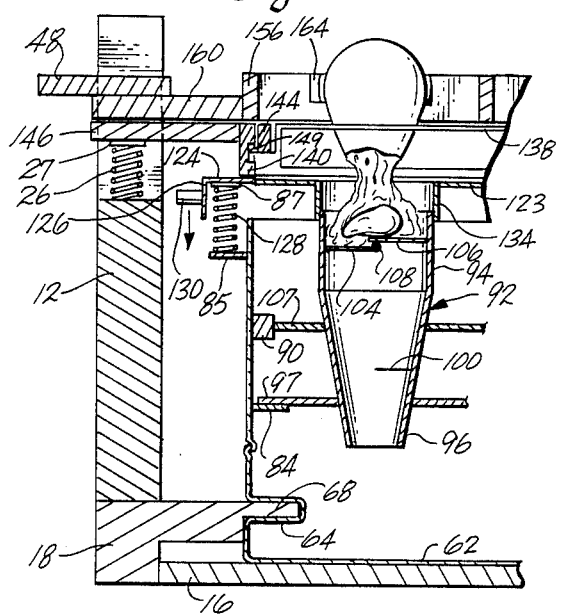
FIG. 10B shows the same cut-away side view as FIG. 10A, but with the components of the invention in the final position of an egg-breaking process.
Figure 10C:
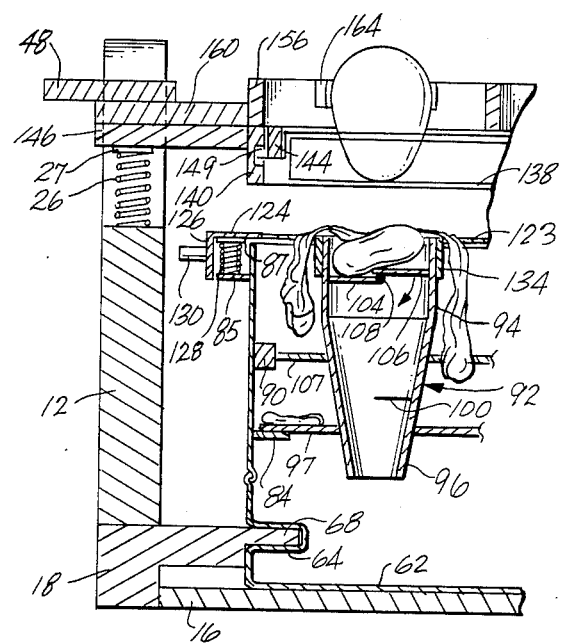
FIG. 10C shows the same cut-away side view as FIG. 10A, but with the components of the invention in a position where the collar grid of FIG. 5 is depressed.
Figure 10D:
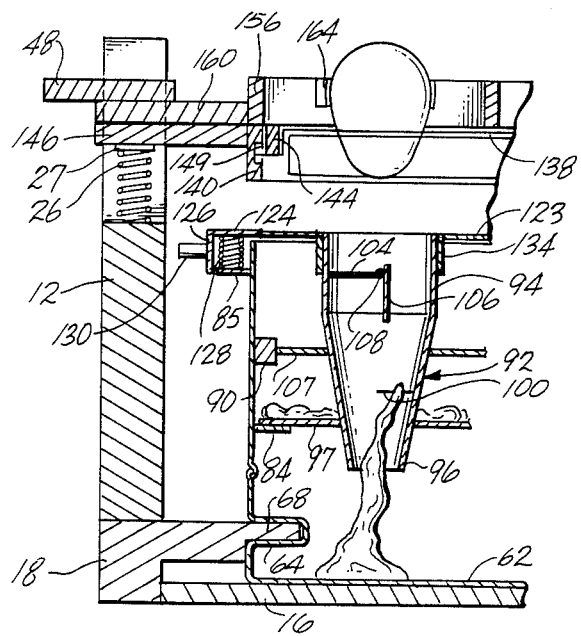
FIG. 10D shows the same cut-away side view as FIG. 10A, but with the components of the invention in a position where the rotating trap doors are open as shown in FIG. 6B.

With reference to FIGS. 10A through 10D, the egg breaking and separating process can now be described starting from the position shown by FIG. 7.

To initiate the process, spring-activation rod 46 is lifted until tangs 32 release coil springs 26 which drive the knives of the knife grid 136 up into the eggs, as shown in FIG. 8. Collar grid 120 is also released. The upward movement of knife grid 136 is halted when extensions 146 engage bars 160, held in place by slot blockers 48.

The sliding knife blades 142 are immediately slid away from stationary knife blades to the spaced-apart position, as shown in FIG. 9, to allow the egg contents to drain into hollow cylinders 134 and cones 92.

The trap door mechanism of the cones is initially closed, causing the egg contents to fill the portion of the cones 92 above the trap door mechanism 102 and the hollow cylinders 134 which extend above the cones 92. portion of the cones 92 above the trap-door mechanism 102 has a volume about equal to the volume of a typical egg yolk. Collar grid 120 is then depressed. This results in egg whites overflowing onto the intermediate floor of cone insert 88 and accumulating in the upper chamber of holding tank 60 where they can be decanted through spout 81.

Once the egg whites have overflowed the cones 92 and only the yolk remains in the portion of the cones 92 above the trap-door mechanism 102, knob 118 is moved to the right, as shown in FIG. 6D, to activate the trap-door mechanism 102, allowing the egg yolks to slide down the cone 92. The egg yolks are broken open by pin 100, and drain into the lower portion of holding tank 60, where they can be decanted through spout 80.

After swinging slot blockers 48 out of the slots 22, knife grid 136 and egg-holder grid 154 can be lifted out of slots 26, at the same time, and cleaned of shells and shell fragments. By reloading egg-holder grid 154 and returning the knife grid 136 to its initial position, the process can be repeated until the capacity of holding tank 60 is reached.

The preceding description has been presented with reference to a presently preferred embodiment of the invention shown in the accompanying drawings. Workers skilled in the art and technology to which this invention pertains will appreciate that alterations and changes in the described apparatus and structure can be practiced without meaningfully departing from the principles, spirit and scope of this invention. Accordingly, the foregoing description should not be read as pertaining only to the precise structures and techniques described, but rather should be read consistent with and as support for the following claims which are to have their fullest fair scope.

What is claimed is:

1. An apparatus for breaking eggs comprising:
egg-holding means for holding a plurality of eggs in an array;
egg-breaking means comprised of a plurality of knife means positioned beneath the egg-holding means, each knife means comprised of a pair of horizontally disposed, vertically oriented knife blades, said knife blades being movable between a first contiguous position and a second spaced-apart position, and movable vertically from a lower position spaced from eggs held by the egg-holding means to an upper position towards the egg-holding means to enable simultaneous breaking of the shells of a plurality of eggs held by the egg-holding means when the knife blades are in the first position, said knife blades having openings therein to allow substantially complete discharge of the contents of the eggs when the knife blades are moved to the second position and while in the upper position; and
means for collecting the discharged contents of eggs broken by the knife means.

2. An apparatus as claimed in claim 1 further comprising means for separating the egg whites and egg yolks of eggs broken by the knife means.

3. An apparatus for breaking eggs comprising:
an egg holder for holding stationary a plurality of eggs, on end, in an array;
egg-breaking means positioned below the egg holder, said egg-breaking means comprising a plurality of knife means, each knife means comprising a pair of horizontally disposed, vertically oriented knife blades positioned below the egg holder, one blade of the pair being fixed and the other blade of the pair being movable horizontally between a first contiguous position with respect to the stationary knife and a second position spaced apart from the other knife blade, both knife blades being movable vertically from a lower position spaced apart from the egg holder to an upper position sufficiently close to the egg holder to partially crack the shells of eggs held by the egg holder when the knife blades are in the first position; and
a receptacle below the knife blades for receiving the contents of eggs broken by the knife blades, said contents being discharged when the movable knife blade is in the second position, said knife blades having openings therein to enable discharge of the contents of the broken eggs.

4. An apparatus as claimed in claim 3 further comprising means for supporting the egg holder and knife blades at positions above the receptacle.

5. An apparatus as claimed in claim 3 further comprising spring means for biasing the knife blades toward the upper position.

6. An apparatus as claimed in claim 5 further comprising means for releasably maintaining the knife blades in the lower position.

7. An apparatus as claimed in claim 3 further comprising means for separating the yolks of eggs from the whites of eggs which have been cracked by the knife blades.

8. An apparatus as claimed in claim 7 wherein the means for separating the egg yolks and egg whites comprises a hollow cone positioned below each egg held by the egg holder and below the knife blades for receiving the contents of an egg broken above the cone, said cone having an open top, and an interior volume about equal to the volume of an egg yolk so that the egg white received by the cone from an egg broken above the cone will overflow the cone into the receptacle and the egg yolk will be retained in the cone.

9. An apparatus as claimed in claim 8 wherein the cones comprise an operable bottom and the receptacle comprises means for subdividing the interior of the receptacle into an upper chamber into which egg whites which overflow the cones collect and a lower chamber into which egg yolks contained within cones can be released through the bottom of the cones when opened.

10. An apparatus as claimed in claim 8 further comprising a generally cylindrical collar snugly fitted around the top edge of each cone, said collar being movable vertically from an upper position wherein the top edge of the collar is above the top edge of the cone and the bottom edge of the collar is at or below the top edge of the cone and a lower position wherein the top edge of the collar is at or below the top edge of the cone.

11. An apparatus for breaking eggs comprising:
an egg-holder grid comprising a select number of egg holders arranged in a predetermined number of generally horizontally disposed rows;
a knife grid below the egg-holder grid comprising a pair of horizontally disposed vertically oriented knife blades positioned below each row of egg holders, at least one knife blade of each pair of knife blades being movable horizontally between a first position contiguous with the other knife blade and a second position spaced apart from the other knife blade, said knife grid being movable vertically between a lower position spaced apart from the egg holder and an upper position sufficiently close to the egg holder for the knife blades to simultaneously crack the shells of eggs held by the egg holder and when the knife blades are in the first position, the knife blades having an opening therein to allow substantially complete discharge of the contents of the eggs when the knife blades are moved to the second position while in the upper position; and
a receptacle below the knife grid for receiving the contents of eggs broken by the knife blades.

12. An apparatus as claimed in claim 11 further comprising means for supporting the egg-holder grid and the knife grid above the receptacle.

13. An apparatus as claimed in claim 11 further comprising spring means for biasing the knife grid toward the upper position.

14. An apparatus as claimed in claim 13 further comprising means for releasably maintaining the knife grid in the lower position.

15. An apparatus as claimed in claim 11 further comprising a cone assembly for separating the egg yolks and egg whites which is removably fitted into the receptacle and comprises an intermediate floor extending across the receptacle at an elevation spaced-apart from the bottom of the receptacle for dividing the interior of the receptacle into an upper chamber above the intermediate floor and a lower chamber below the intermediate floor, said cone assembly further comprising a generally hollow cone extending through the intermediate floor at positions below each egg holder for receiving the contents of an egg held by the egg holder which is broken above the cone, said cone having an open top, an openable bottom for releasing egg contents contained therein into the lower chamber, and an interior volume about equal to the volume of an egg yolk so that the egg white received by the cone from an egg broken above the cone will overflow the cone and be retained in the upper chamber.

16. An apparatus as claimed in claim 15 wherein the cones further comprise means for breaking the yolks of the eggs as the yolks are released into the lower chamber.

17. An apparatus as claimed in claim 15 further comprising a collar grid comprising a generally cylindrical collar fittable snugly around the top edge of each cone, said collar grid being movable vertically from an upper position wherein the top edges of the collars are above the top edges of the cones and the bottom edges of the collars are below the top edges of the cones and a lower position wherein the top edges of the collars are at or below the top edges of the cones.

18. An apparatus for breaking eggs comprising:
an egg holder for holding a plurality of eggs in an array and in a substantially stationary position;
means for simultaneously cracking the shells of the eggs by the egg holder to discharge the contents of the egg;
a plurality of cone assemblies below the means for simultaneously cracking the shells of the eggs, each cone assembly being positioned for receiving the contents of the broken egg and for separating the discharged egg yolk and egg white, each cone assembly being comprised of a generally hollow cone having an open top edge positioned to receive the discharged contents of an egg, said generally hollow cone having an interior volume approximately equal to the volume of an egg yolk so that an egg white received by the cone from an egg broken above the cone will overflow the cone, and each cone assembly having an openable bottom for releasing an egg yolk after the egg white overflows the cone;
a receptacle for receiving the overflowed egg white; and
a receptacle, in communication with the openable bottom of each cone assembly for receiving the released egg yolk.

19. An apparatus as claimed in claim 18 further comprising a collar grid comprised of substantially cylindrical collars, each having a top edge and a bottom edge, said collars being slidably fitted around each top edge of a cone, said collar grid being movable from an upper position whereby the top edge of the collar is above the top edge of a cone and the bottom edge of the collar is below the top edge of a cone, to a lower position wherein the top edge of the collar is proximate the top edge of a cone.

20. An apparatus as claimed in claim 18 in which the egg-holding means has flexible holders to hold the eggs in a substantially vertical position so that an end of the eggs is cracked by the knife blades.

21. An apparatus as claimed in claim 18 in which each cone includes means to break the yolk of an egg passing through the cone.

22. An apparatus for breaking eggs comprising:
an egg-holder grid comprising a select number of egg holders arranged in a predetermined number of generally horizontally disposed rows, said egg holders holding eggs on end in vertical orientation;
a knife grid below the egg-holder grid comprising a pair of horizontally disposed vertically oriented knife blades positioned below each row of egg holders, at least one knife blade of each pair of knife blades being movable horizontally between a first position contiguous with the other knife blade and a second position spaced apart from the other knife blade, said knife grid being movable vertically between a lower position spaced apart from the egg holder and an upper position sufficiently close to the egg holder for the knife blades to simultaneously crack the shells of eggs held by the egg holder and when the knife blades are in the first position, the knife blades having an opening therein to allow substantially complete discharge of the contents of the eggs when the knife blades are moved to the second position while in the upper position;
a plurality of cone assemblies below the knife grid, each cone assembly being positioned to receive the contents of the broken egg and for separating the discharged egg yolk and egg white, each cone assembly being comprised of a generally hollow cone having an open top edge positioned to receive the discharged contents of an egg, an interior volume approximately equal to the volume of an egg yolk so that an egg white received by the cone from an egg broken above the cone will overflow the cone, and an openable bottom for releasing an egg yolk after the egg white overflows the cone;
a receptacle for receiving the overflowed egg white;
a receptacle, in communication with the openable bottom of each cone assembly for receiving the released egg yolk;
a collar grid comprised of substantially cylindrical collars, each having a top edge and a bottom edge slidably fitted around each top edge of a cone, said collar grid being movable from an upper position whereby the top edge of the collar is above the top edge of a cone and the bottom edge of the collar is below the top edge of a cone, to a lower position wherein the top edge of the collar is proximate the top edge of a cone; and
a support means for holding said egg-holder grid and said knife grid and containing:
(i) spring means for biasing the knife blades towards the upper position; and
(ii) means for releasably maintaining the knife blades in the lower position.

23. An apparatus as claimed in claim 22 in which each cone includes means to break the yolk of an egg passing through the cone.

* * * * *